(12) United States Patent
Lesso

(10) Patent No.: US 11,074,917 B2
(45) Date of Patent: Jul. 27, 2021

(54) SPEAKER IDENTIFICATION

(71) Applicant: Cirrus Logic International Semiconductor Ltd., Edinburgh (GB)

(72) Inventor: John Paul Lesso, Edinburgh (GB)

(73) Assignee: Cirrus Logic, inc., Austin, TX (US)

( * ) Notice: Subject to any disclaimer, the term of this patent is extended or adjusted under 35 U.S.C. 154(b) by 77 days.

(21) Appl. No.: 16/170,717

(22) Filed: Oct. 25, 2018

(65) Prior Publication Data

US 2019/0130919 A1    May 2, 2019

Related U.S. Application Data

(60) Provisional application No. 62/578,667, filed on Oct. 30, 2017.

(30) Foreign Application Priority Data

Nov. 28, 2017 (GB) ........................ 1719734

(51) Int. Cl.
  *G10L 17/06* (2013.01)
  *G10L 21/0232* (2013.01)
  (Continued)

(52) U.S. Cl.
  CPC .............. *G10L 17/06* (2013.01); *G10L 17/02* (2013.01); *G10L 17/08* (2013.01); *G10L 17/20* (2013.01); *G10L 21/0232* (2013.01); *G10L 25/18* (2013.01); *G10L 25/84* (2013.01); *G10L 17/22* (2013.01); *G10L 21/0208* (2013.01); *G10L 25/93* (2013.01)

(58) Field of Classification Search
  CPC ......... G10L 25/48; G10L 25/51; G10L 25/84; G10L 25/87; G10L 25/93; G10L 17/00; G10L 17/005; G10L 17/06; G10L 17/22
  See application file for complete search history.

(56) References Cited

U.S. PATENT DOCUMENTS 5,197,113 A * 3/1993 Mumolo ................. G10L 25/93
                                                    704/200
5,568,559 A * 10/1996 Makino .................. H03G 5/165
                                                    381/56

(Continued)

FOREIGN PATENT DOCUMENTS

CN    101814290 A    8/2010
WO    02/103680 A2    12/2002

OTHER PUBLICATIONS

G. Saha et al., "A New Silence Removal and Endpoint Detection Algorithm for Speech and Speaker Recognition Applications". (Year: 2006).*

(Continued)

*Primary Examiner* — Anne L Thomas-Homescu
(74) *Attorney, Agent, or Firm* — Jackson Walker L.L.P.

(57) ABSTRACT

A method of speaker identification, comprises: receiving an audio signal representing speech; removing effects of a channel and/or noise from the received audio signal to obtain a cleaned audio signal; obtaining an average spectrum of at least a part of the cleaned audio signal; and comparing the average spectrum with a long term average speaker model for an enrolled speaker. Based on the comparison, it can be determined whether the speech is the speech of the enrolled speaker.

11 Claims, 11 Drawing Sheets

(51) Int. Cl.
*G10L 17/02* (2013.01)
*G10L 25/84* (2013.01)
*G10L 17/08* (2013.01)
*G10L 25/18* (2013.01)
*G10L 17/20* (2013.01)
*G10L 17/22* (2013.01)
*G10L 21/0208* (2013.01)
*G10L 25/93* (2013.01)

(56) References Cited

U.S. PATENT DOCUMENTS

| | | | | |
|---|---|---|---|---|
| 5,640,490 | A * | 6/1997 | Hansen | G10L 15/02 704/254 |
| 5,930,749 | A * | 7/1999 | Maes | G10L 21/0272 704/219 |
| 6,718,306 | B1 * | 4/2004 | Satoh | G10L 17/00 382/190 |
| 7,440,891 | B1 * | 10/2008 | Shozakai | G10L 15/20 704/233 |
| 7,454,337 | B1 * | 11/2008 | Smith | G10L 17/04 704/240 |
| 8,160,877 | B1 * | 4/2012 | Nucci | G10L 17/06 704/246 |
| 8,489,399 | B2 * | 7/2013 | Gross | G10L 15/22 704/260 |
| 8,639,502 | B1 * | 1/2014 | Boucheron | G10L 21/02 381/94.1 |
| 9,009,052 | B2 * | 4/2015 | Nakano | G10L 13/033 704/268 |
| 9,484,036 | B2 * | 11/2016 | Kons | G10L 25/51 |
| 10,079,024 | B1 * | 9/2018 | Bhimanaik | G10L 17/06 |
| 10,192,553 | B1 * | 1/2019 | Chenier | G10L 15/22 |
| 10,388,272 | B1 * | 8/2019 | Thomson | G10L 15/22 |
| 10,573,312 | B1 * | 2/2020 | Thomson | G10L 15/22 |
| 2004/0236573 | A1 * | 11/2004 | Sapeluk | G10L 17/02 704/224 |
| 2008/0010065 | A1 * | 1/2008 | Bratt | G06K 9/6222 704/246 |
| 2009/0119096 | A1 * | 5/2009 | Gerl | G10L 21/0208 704/207 |
| 2011/0099014 | A1 * | 4/2011 | Zopf | G10L 19/16 704/262 |
| 2011/0137644 | A1 * | 6/2011 | Nilsson | H04M 3/40 704/205 |
| 2011/0276323 | A1 * | 11/2011 | Seyfetdinov | G10L 21/02 704/207 |
| 2012/0166195 | A1 * | 6/2012 | Hayakawa | G10L 17/26 704/240 |
| 2013/0024191 | A1 * | 1/2013 | Krutsch | G10L 21/038 704/205 |
| 2015/0006163 | A1 * | 1/2015 | Liu | G10L 19/00 704/205 |
| 2015/0071461 | A1 * | 3/2015 | Thyssen | G10L 21/0208 381/94.1 |
| 2015/0340027 | A1 * | 11/2015 | Wang | G10L 15/07 704/221 |
| 2016/0134984 | A1 * | 5/2016 | Erkelens | G10L 21/0232 381/56 |
| 2016/0234204 | A1 * | 8/2016 | Rishi | H04L 63/0428 |
| 2016/0284343 | A1 * | 9/2016 | Short | G10L 15/02 |
| 2017/0103748 | A1 * | 4/2017 | Weissberg | G10L 15/063 |
| 2017/0169828 | A1 * | 6/2017 | Sachdev | G10L 25/51 |
| 2018/0254046 | A1 * | 9/2018 | Khoury | G10L 17/00 |
| 2019/0115032 | A1 * | 4/2019 | Lesso | G10L 25/51 |
| 2019/0115046 | A1 * | 4/2019 | Lesso | G10L 21/02 |
| 2019/0362740 | A1 * | 11/2019 | Hauptman | A61B 5/02 |

OTHER PUBLICATIONS

Hu et al., "Segregation of unvoiced speech from nonspeech interference", J. Acoust. Soc. Am. 124(2), Aug. 2008 (Year: 2008).*
Search Report under Section 17, UKIPO, Application No. GB1719734.4, dated May 29, 2018.
Wikipedia, Voice (phonetics), https://en.wikipedia.org/wiki/Voice_(phonetics), accessed Jun. 1, 2020.

* cited by examiner

SPEAKER IDENTIFICATION

TECHNICAL FIELD

Embodiments described herein relate to methods and devices for analysing speech signals.

BACKGROUND

Many devices include microphones, which can be used to detect ambient sounds. In many situations, the ambient sounds include the speech of one or more nearby speaker. Audio signals generated by the microphones can be used in many ways. For example, audio signals representing speech can be used as the input to a speech recognition system, allowing a user to control a device or system using spoken commands.

SUMMARY

According to an aspect of the invention, there is provided a method of speaker identification, comprising: receiving an audio signal representing speech; removing effects of a channel and/or noise from the received audio signal to obtain a cleaned audio signal; obtaining an average spectrum of at least a part of the cleaned audio signal; comparing the average spectrum with a long term average speaker model for an enrolled speaker; and determining based on the comparison whether the speech is the speech of the enrolled speaker.

Obtaining an average spectrum of at least a part of the cleaned audio signal may comprise obtaining an average spectrum of a part of the cleaned audio signal representing voiced speech.

Obtaining an average spectrum of at least a part of the cleaned audio signal may comprise obtaining a first average spectrum of a part of the cleaned audio signal representing a first acoustic class and obtaining a second average spectrum of a part of the cleaned audio signal representing a second acoustic class, and comparing the average spectrum with a long term average speaker model for an enrolled speaker may comprise comparing the first average spectrum with a long term average speaker model for the first acoustic class for the enrolled speaker and comparing the second average spectrum with a long term average speaker model for the second acoustic class for the enrolled speaker.

The first acoustic class may be voiced speech and the second acoustic class unvoiced speech.

The method may comprise comparing the average spectrum with respective long term average speaker models for each of a plurality of enrolled speakers; and determining based on the comparison whether the speech is the speech of one of the enrolled speakers.

The method may further comprise comparing the average spectrum with a Universal Background Model; and including a result of the comparing the average spectrum with the Universal Background Model in determining whether the speech is the speech of one of the enrolled speakers.

The method may comprise identifying one of the enrolled speakers as a most likely candidate as a source of the speech.

The method may comprise: obtaining information about the effects of a channel and/or noise on the received audio signal by: receiving the audio signal representing speech; extracting first and second components of the audio signal representing first and second acoustic classes of the speech respectively; analysing the first and second components of the audio signal with models of the first and second acoustic classes of the speech of an enrolled user; and, based on said analysing, obtaining information about at least one of a channel and noise affecting said audio signal.

The method may comprise analysing the first and second components of the audio signal with models of the first and second acoustic classes of the speech of a plurality of enrolled users, to obtain respective hypothetical values of the channel, and determining that the speech is not the speech of any enrolled speaker whose models give rise to physically implausible hypothetical values of the channel.

A hypothetical value of the channel may be considered to be physically implausible if it contains variations exceeding a threshold level across the relevant frequency range. A hypothetical value of the channel may be considered to be physically implausible if it contains significant discontinuities.

According to another aspect of the present invention, there is provided a system for analysing an audio signal, configured for performing the method.

According to another aspect of the present invention, there is provided a device comprising such a system. The device may comprise a mobile telephone, an audio player, a video player, a mobile computing platform, a games device, a remote controller device, a toy, a machine, or a home automation controller or a domestic appliance.

According to another aspect of the present invention, there is provided a computer program product, comprising a computer-readable tangible medium, and instructions for performing a method according to the first aspect.

According to another aspect of the present invention, there is provided a non-transitory computer readable storage medium having computer-executable instructions stored thereon that, when executed by processor circuitry, cause the processor circuitry to perform a method according to the first aspect.

BRIEF DESCRIPTION OF DRAWINGS

For a better understanding of the present invention, and to show how it may be put into effect, reference will now be made to the accompanying drawings, in which.

DETAILED DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The methods described herein can be implemented in a wide range of devices and systems. However, for ease of explanation of one embodiment, an illustrative example will be described, in which the implementation occurs in a smartphone.

Figure 1:
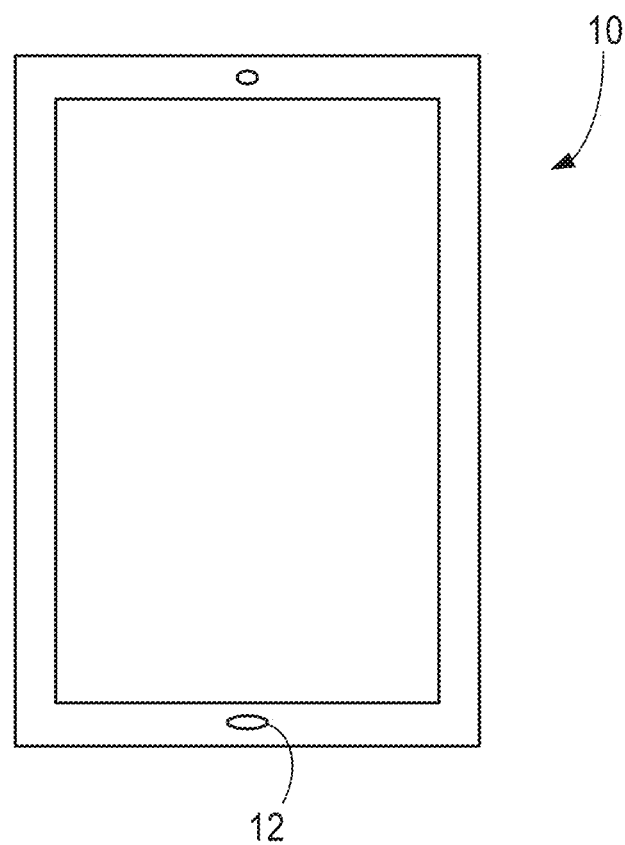
FIG. 1 illustrates a smartphone.

FIG. 1 illustrates a smartphone 10, having a microphone 12 for detecting ambient sounds. In normal use, the microphone is of course used for detecting the speech of a user who is holding the smartphone 10 close to their face.

Figure 2:
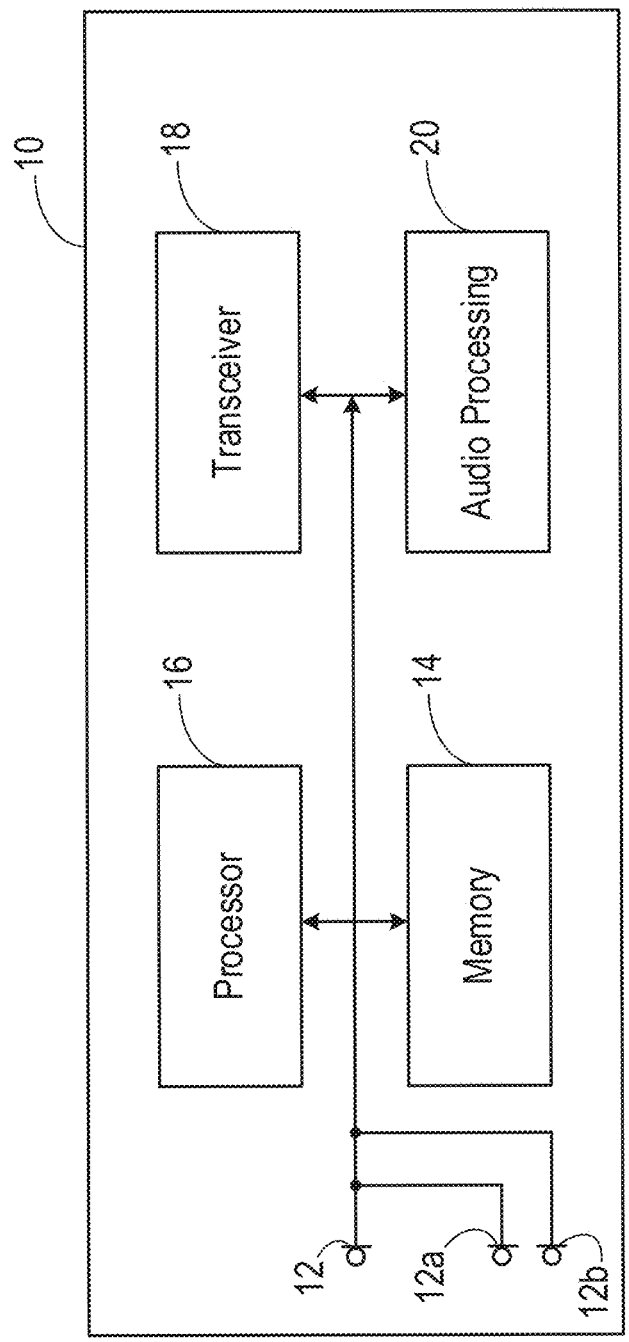
FIG. 2 is a schematic diagram, illustrating the form of the smartphone.

FIG. 2 is a schematic diagram, illustrating the form of the smartphone 10.

Specifically, FIG. 2 shows various interconnected components of the smartphone 10. It will be appreciated that the smartphone 10 will in practice contain many other components, but the following description is sufficient for an understanding of the present invention.

Thus, FIG. 2 shows the microphone 12 mentioned above. In certain embodiments, the smartphone 10 is provided with multiple microphones 12, 12a, 12b, etc.

FIG. 2 also shows a memory 14, which may in practice be provided as a single component or as multiple components. The memory 14 is provided for storing data and program instructions.

FIG. 2 also shows a processor 16, which again may in practice be provided as a single component or as multiple components. For example, one component of the processor 16 may be an applications processor of the smartphone 10.

FIG. 2 also shows a transceiver 18, which is provided for allowing the smartphone 10 to communicate with external networks. For example, the transceiver 18 may include circuitry for establishing an internet connection either over a WiFi local area network or over a cellular network.

FIG. 2 also shows audio processing circuitry 20, for performing operations on the audio signals detected by the microphone 12 as required. For example, the audio processing circuitry 20 may filter the audio signals or perform other signal processing operations.

In this embodiment, the smartphone 10 is provided with voice biometric functionality, and with control functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

Methods described herein proceed from the recognition that different parts of a user's speech have different properties.

Specifically, it is known that speech can be divided into voiced sounds and unvoiced or voiceless sounds. A voiced sound is one in which the vocal cords of the speaker vibrate, and a voiceless sound is one in which they do not.

It is now recognised that the voiced and unvoiced sounds have different frequency properties, and that these different frequency properties can be used to obtain useful information about the speech signal.

Figure 3:
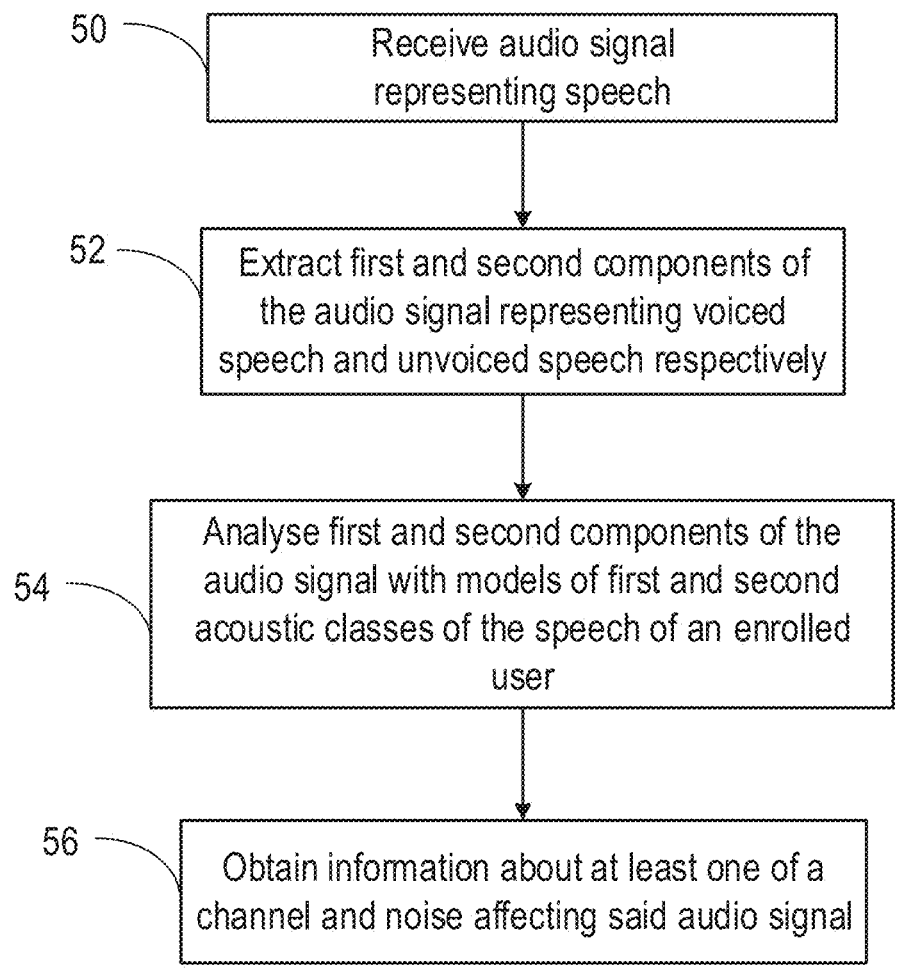
FIG. 3 is a flow chart illustrating a method of analysing an audio signal.
Figure 4:
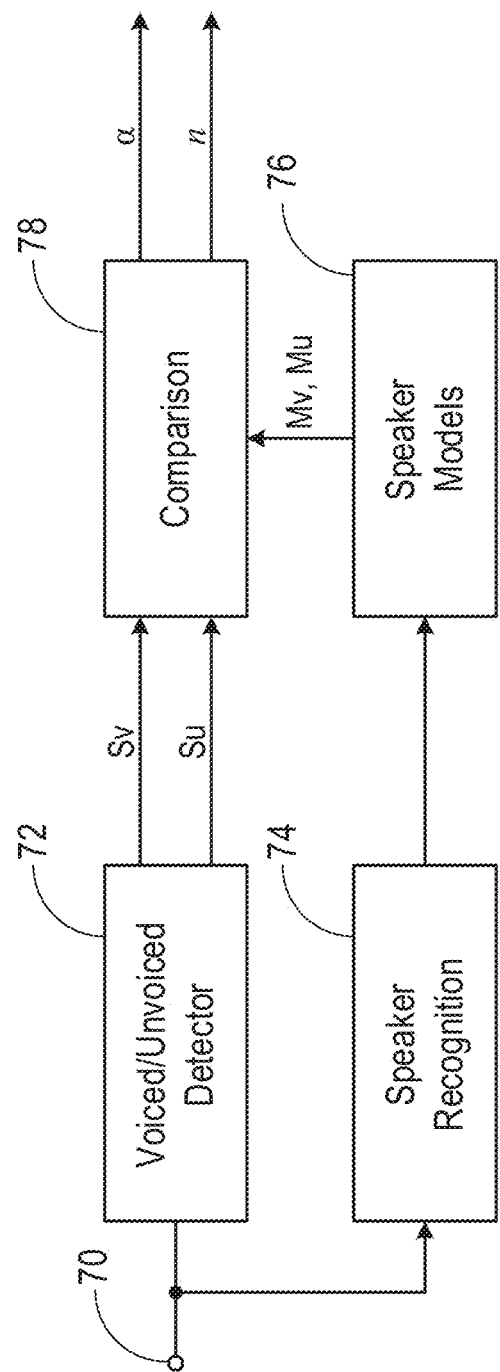
FIG. 4 is a block diagram illustrating a system for analysing an audio signal.

FIG. 3 is a flow chart, illustrating a method of analysing an audio signal, and FIG. 4 is a block diagram illustrating functional blocks in the analysis system.

Specifically, in step 50 in the method of FIG. 3, an audio signal, which is expected to contain speech, is received on an input 70 of the system shown in FIG. 4.

The received signal is divided into frames, which may for example have lengths in the range of 10-100 ms, and then passed to a voiced/unvoiced detection block 72. Thus, in step 52 of the process, first and second components of the audio signal, representing different first and second acoustic classes of the speech, are extracted from the received signal. Extracting the first and second components of the audio signal may comprise identifying periods when the audio signal contains the first acoustic class of speech, and identifying periods when the audio signal contains the second acoustic class of speech. More specifically, extracting the first and second components of the audio signal may comprise identifying frames of the audio signal that contain the first acoustic class of speech, and frames that contain the second acoustic class of speech.

When the first and second acoustic classes of the speech are voiced speech and unvoiced speech, there are several methods that can be used to identify voiced and unvoiced speech, for example: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

In the embodiments described further below, the first and second acoustic classes of the speech are voiced speech and unvoiced speech. However, the first and second acoustic classes of the speech may be any phonetically distinguishable acoustic classes. For example, they may be different phoneme classes, for example two different sets of vowels; they may be two different fricatives; or the first class may be fricatives while the second class are sibilants.

The received signal may be supplied to a voice activity detection block, and only supplied to the voiced/unvoiced detection block 72 when it is determined that it does contain speech. In that case, or otherwise when there is reason to believe that the audio signal contains only speech, the step of identifying periods when the audio signal contains unvoiced speech may comprise identifying periods when the audio signal contains voiced speech, and identifying the remaining periods of speech as containing unvoiced speech.

The voiced/unvoiced detection block 72 may for example be based on Praat speech analysis software.

The voiced/unvoiced detection block 72 thus outputs the first component of the audio signal, Sv, representing voiced speech and the second component, Su, representing unvoiced speech.

More specifically, in some embodiments, the first component of the audio signal, Sv, representing voiced speech and the second component, Su, representing unvoiced speech, are averaged spectra of the voiced and unvoiced components of the speech.

By averaged spectra are meant spectra of the speech obtained and averaged over multiple frames.

The spectra can be averaged over enough data to provide reasonable confidence in the information that is obtained about the speech signal. In general terms, this information will become more reliable as more data is used to form the average spectra.

In some cases, spectra averaged over 500 ms of the relevant speech will be enough to provide reliable averaged spectra. The length of time over which the averaged spectra are generated may be adapted based on the articulation rate of the speech, in order to ensure that the speech contains enough phonetic variation to provide a reliable average. The length of time over which the averaged spectra are generated may be adapted based on the content of the speech. If the user is speaking a predetermined known phrase, this may be more discriminative than speaking words of the user's choosing, and so a useful average can be obtained in a shorter period. The process illustrated in FIG. 3 may be performed regularly while the user is speaking, providing regularly updated information at the end of the method as more speech is received. It may then be judged that enough speech has been processed when the results of the method converge to stable values.

The signal received on the input 70 is also passed to a speaker recognition block 74, which performs a voice biometric process to identify the speaker, from amongst a plurality of enrolled speakers. The process of enrolment in a speaker recognition system typically involves the speaker providing a sample of speech, from which specific features are extracted, and the extracted features are used to form a model of the speaker's speech. In use, corresponding features are extracted from a sample of speech, and these are compared with the previously obtained model to obtain a measure of the likelihood that the speaker is the previously enrolled speaker.

In some situations, the speaker recognition system attempts to identify one or more enrolled speaker without any prior expectation as to who the speaker should be. In other situations, there is a prior expectation as to who the speaker should be, for example because there is only one enrolled user of the particular device that is being used, or because the user has already identified themselves in some other way.

In this illustrated example, the speaker recognition block 74 is used to identify the speaker. In other examples, there may be an assumption that the speaker is a particular person, or is selected from a small group of people.

In step 54 of the process shown in FIG. 3, the first and second components of the audio signal are compared with models of the first acoustic class (for example the voiced component) of the speech of an enrolled user and of the second acoustic class (for example the unvoiced component) of the speech of the enrolled user. For example, comparing the first and second components of the audio signal with the models of the voiced and unvoiced speech of the enrolled user may comprise comparing magnitudes of the audio signal at a number of predetermined frequencies with magnitudes in the models.

Thus, in the system shown in FIG. 4, one or more speaker model is stored, for example in a database. Based on the output of the speaker recognition block 74, or based on a prior assumption as to who the speaker is expected to be, one or more speaker model is selected.

In this embodiment, each speaker model contains separate models of the voiced speech and the unvoiced speech of the enrolled user. More specifically, the model of the voiced speech and the model of the unvoiced speech of the enrolled user each comprise amplitude values corresponding to multiple frequencies.

Figure 5:
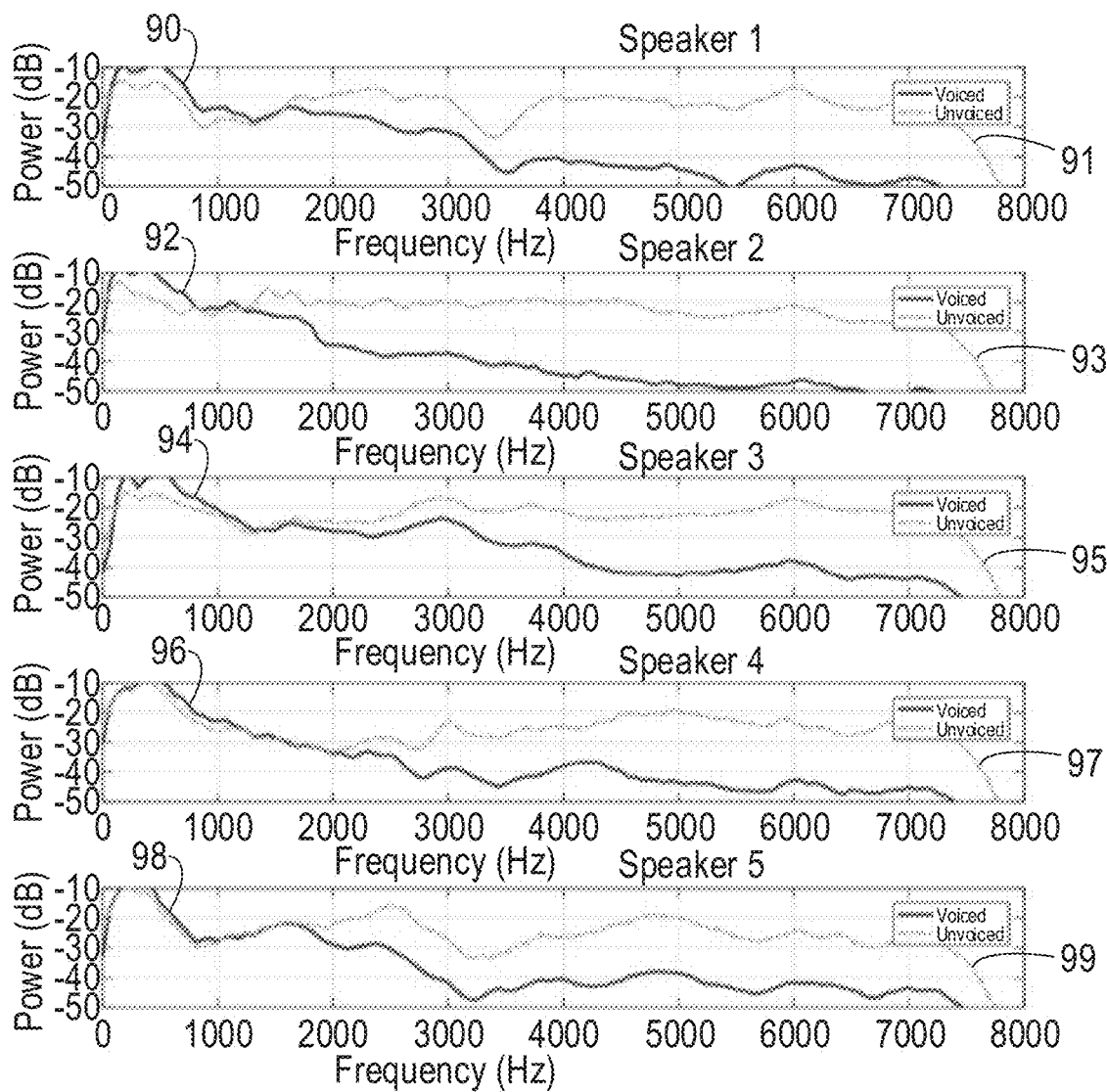
FIG. 5 illustrates results in the method of FIG. 3.

Thus, FIG. 5 shows a multiple speaker models.

Specifically, each speaker model shown in FIG. 5 comprises a long term averaged spectrum of the voiced components of the speech and a long term averaged spectrum of the unvoiced components of the speech. These models are obtained from the respective speakers during previous separate enrolment processes, during which the speakers speak, either uttering predetermined standard test phrases or saying words of their own choosing.

FIG. 5 shows the speaker models for five speakers, labelled Speaker 1-Speaker 5. The model for Speaker 1 comprises the long term averaged spectrum 90 of the voiced components of the speech and the long term averaged spectrum 91 of the unvoiced components of the speech; the model for Speaker 2 comprises the long term averaged spectrum 92 of the voiced components of the speech and the long term averaged spectrum 93 of the unvoiced components of the speech; the model for Speaker 3 comprises the long term averaged spectrum 94 of the voiced components of the speech and the long term averaged spectrum 95 of the unvoiced components of the speech; the model for Speaker 4 comprises the long term averaged spectrum 96 of the voiced components of the speech and the long term averaged spectrum 97 of the unvoiced components of the speech; and the model for Speaker 5 comprises the long term averaged spectrum 98 of the voiced components of the speech and the long term averaged spectrum 99 of the unvoiced components of the speech.

In each case, the model of the speech comprises a vector containing amplitude values at a plurality of frequencies.

The plurality of frequencies may be selected from within a frequency range that contains the most useful information for discriminating between speakers. For example, the range may be from 20 Hz to 8 kHz, or from 20 Hz to 4 kHz.

The frequencies at which the amplitude values are taken may be linearly spaced, with equal frequency spacings between each adjacent pair of frequencies. Alternatively, the frequencies may be non-linearly spaced. For example, the frequencies may be equally spaced on the mel scale.

The number of amplitude values used to form the model of the speech may be chosen depending on the frequency spacings. For example, using linear spacings the model may contain amplitude values for 64 to 512 frequencies. Using mel spacings, it may be possible to use fewer frequencies, for example between 10 and 20 mel-spaced frequencies.

Thus, the model of the voiced speech may be indicated as Mv, where Mv represents a vector comprising one amplitude value at each of the selected frequencies, while the model of the unvoiced speech may be indicated as Mu, where Mu represents a vector comprising one amplitude value at each of the selected frequencies.

As will be appreciated, the received signal, containing the user's speech, will be affected by the properties of the channel, which we take to mean any factor that produces a difference between the user's speech and the speech signal as generated by the microphone alters, and the received signal will also be affected by noise.

Thus, assuming that the channel and the noise are constant over the period during which the received signal is averaged to form the first and second components of the received speech, these first and second components can be expressed as:

$$Sv = \alpha \cdot Mv + n, \text{ and}$$

$$Su = \alpha \cdot Mu + n,$$

where $\alpha$ represents the frequency spectrum of a multiplicative disturbance component, referred to herein as the channel, and n represents the frequency spectrum of an additive disturbance component, referred to herein as the noise.

Thus, with measurements Sv and Su, and with models Mv and Mu, these two equations can therefore be solved for the two unknowns, a and n.

Thus, for illustrative purposes, $$\alpha = \frac{(Su - Sv)}{(Mu - Mv)}, \text{ and}$$

$$n = \frac{(SuMv - SvMu)}{(Mu - Mv)}.$$

For completeness, it should be noted that, with measurements of the spectrum made at a plurality of frequencies, these two equations are effectively solved at each of the frequencies.

Alternatively, with measurements made at f different frequencies, the equations $Sv = \alpha \cdot Mv + n$, and $Su = \alpha \cdot Mu + n$ can each be regarded as f different equations to be solved.

In that case, having solved the equations, it may be useful to apply a low-pass filter, or a statistical filter such as a Savitsky-Golay filter, to the results in order to obtain low-pass filtered versions of the channel and noise characteristics.

As an alternative example, a least squares method may be used to obtain solutions to the 2f different equations.

It will be noted that the calculations set out above rely on determining the difference (Mu−Mv) between the model of the unvoiced speech and the model of the voiced speech. Where these are similar, for example in the range 1.3-1.6 kHz in the case of Speaker 1 in FIG. 5, then any small uncertainties in either of the models will potentially be magnified into large errors in the calculated values for the channel and/or the noise. Thus, the calculated values in any such frequency ranges may be given lower significance in any subsequent processing steps that use the calculated values, for example a reduced can weight applied to the values used in later processing steps. Alternatively, when it is known in advance that the model of the unvoiced speech and the model of the voiced speech are similar in a particular frequency range, the equations given above need not be solved for frequencies in this range.

Thus, as shown in step 56 of the process shown in FIG. 3, information is obtained about the channel and/or the noise affecting the audio signal.

This information can be used in many different ways.

Figure 6:
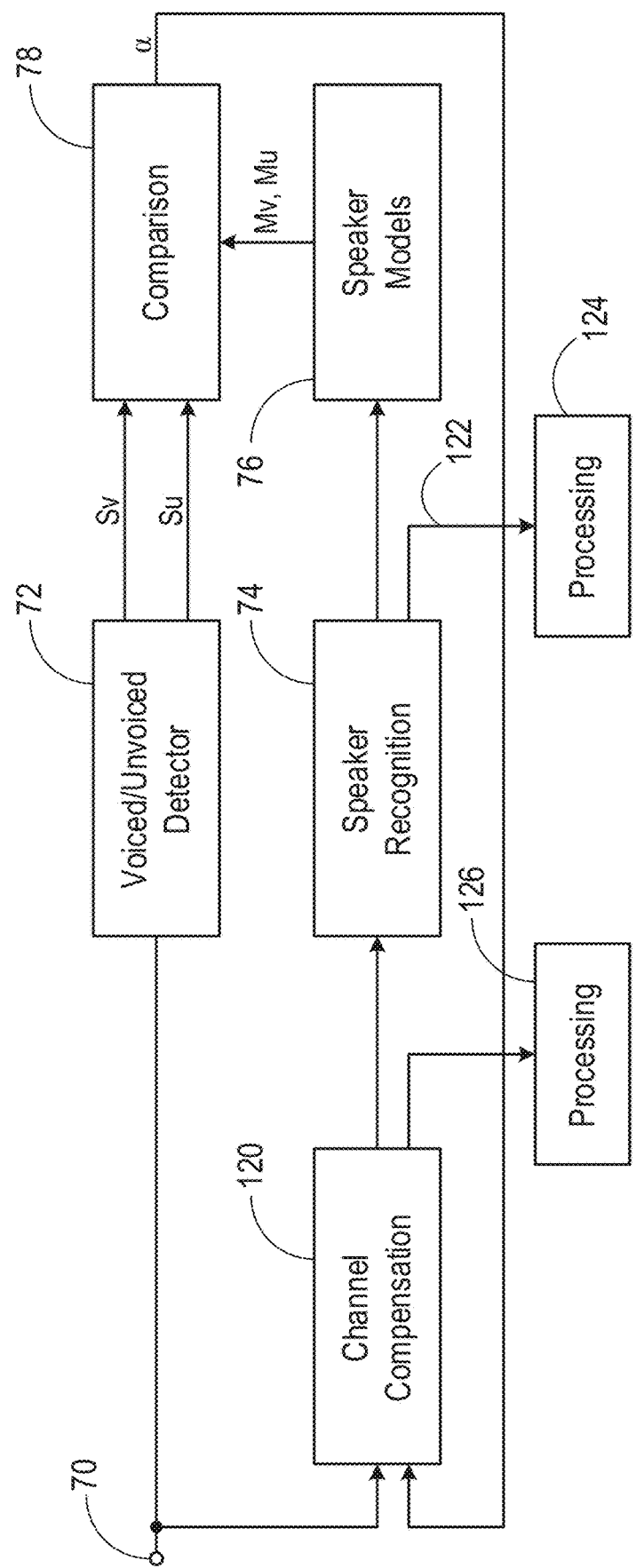
FIG. 6 is a block diagram illustrating an alternative system for analysing an audio signal.

FIG. 6 illustrates one such use. The system shown in FIG. 6 is similar to the system of FIG. 4, and the same reference numerals are used to refer to the same components of the system.

In the system of FIG. 6, the comparison block 78 is used to obtain information about the channel $\alpha$ that is affecting the received audio signal. Specifically, the comparison block 78 may be used to obtain the frequency spectrum of the channel. This can be used to compensate the received audio signal to take account of the channel.

For one example, FIG. 6 shows a channel compensation block 120, to which the audio signal received on the input 70 is supplied. The channel compensation block 120 also receives the frequency spectrum of the channel $\alpha$. The channel compensation block 120 acts to remove the effects of the channel from the received signal, by dividing the received signal by the calculated channel $\alpha$, before the received signal is passed to the speaker recognition block 74.

Thus, the output of the speaker recognition block 74, on the output 122, can be improved. That is, it can provide more reliable information about the identity of the speaker. This can then be supplied to a processing block 124 and used for any required purposes.

The output of the channel compensation block 120, containing the received signal after the effects of the channel have been removed, can be supplied to any suitable processing block 126, such as a speech recognition system, or the like.

Figure 7:
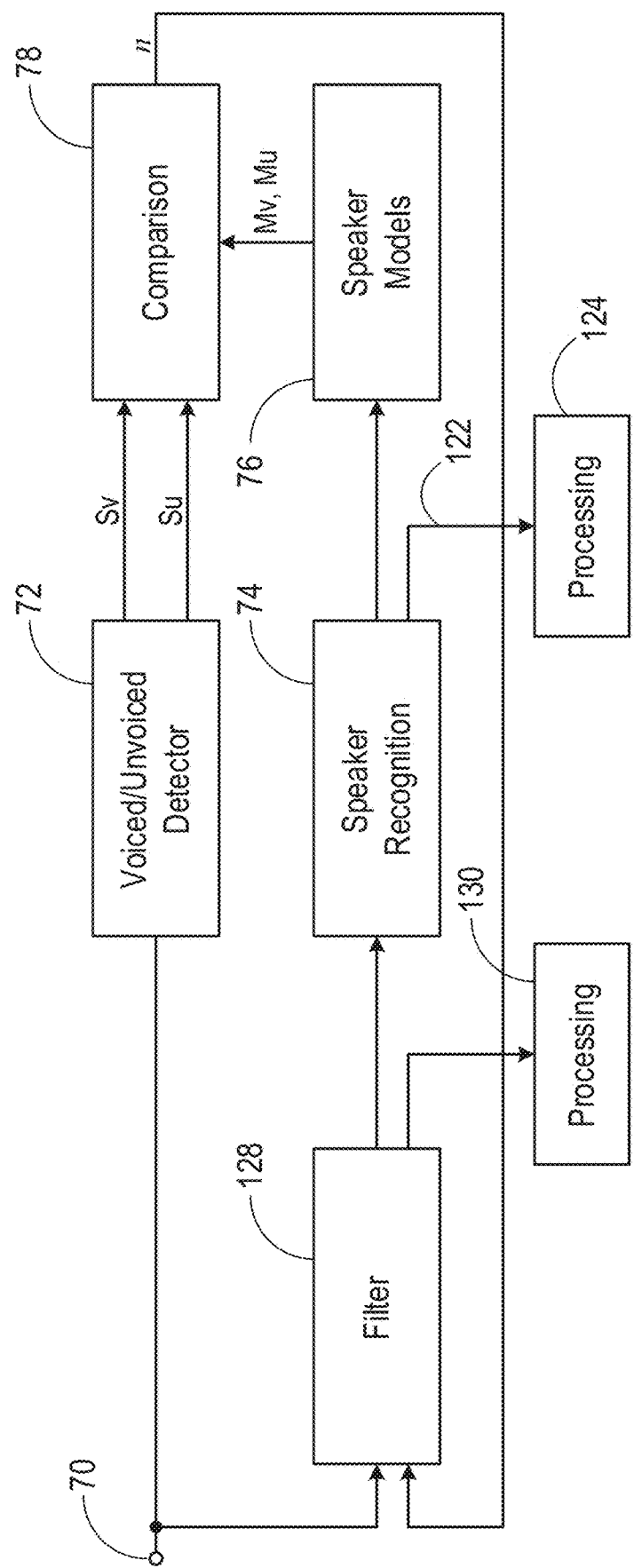
FIG. 7 is a block diagram illustrating a further alternative system for analysing an audio signal.

FIG. 7 illustrates another such use. The system shown in FIG. 7 is similar to the system of FIG. 4, and the same reference numerals are used to refer to the same components of the system.

In the system of FIG. 7, the comparison block 78 is used to obtain information about the noise n that is affecting the received audio signal. Specifically, the comparison block 78 may be used to obtain the frequency spectrum of the noise. This can be used to take account of the noise when processing the received audio signal.

For one example, FIG. 7 shows a filter block 128, to which the audio signal received on the input 70 is supplied. The filter block 128 also receives the frequency spectrum of the noise n. The filter block 128 acts so as to ensure that noise does not adversely affect the operation of the speaker recognition block 74.

For example, the calculated noise characteristic, n, can be subtracted from the received signal before any further processing takes place.

In another example, where the level of noise exceeds a predetermined threshold level at one or more frequencies, such that the operation of the speaker recognition block 74 could be compromised, the filter block 128 can remove the corrupted components of the received audio signal at those frequencies, before passing the signal to the speaker recognition block 74. Alternatively, these components could instead be flagged as being potentially corrupted, before being passed to the speaker recognition block 74 or any further signal processing block.

Thus, the output of the speaker recognition block 74, on the output 122, can be improved. That is, it can provide more reliable information about the identity of the speaker. This can then be supplied to any suitable processing block 124, and used for any required purposes.

The output of the filter block 128, containing the received signal after the frequency components that are excessively corrupted by noise have been removed, can be supplied to any suitable processing block 130, such as a speech recognition system, or the like.

Figure 8:
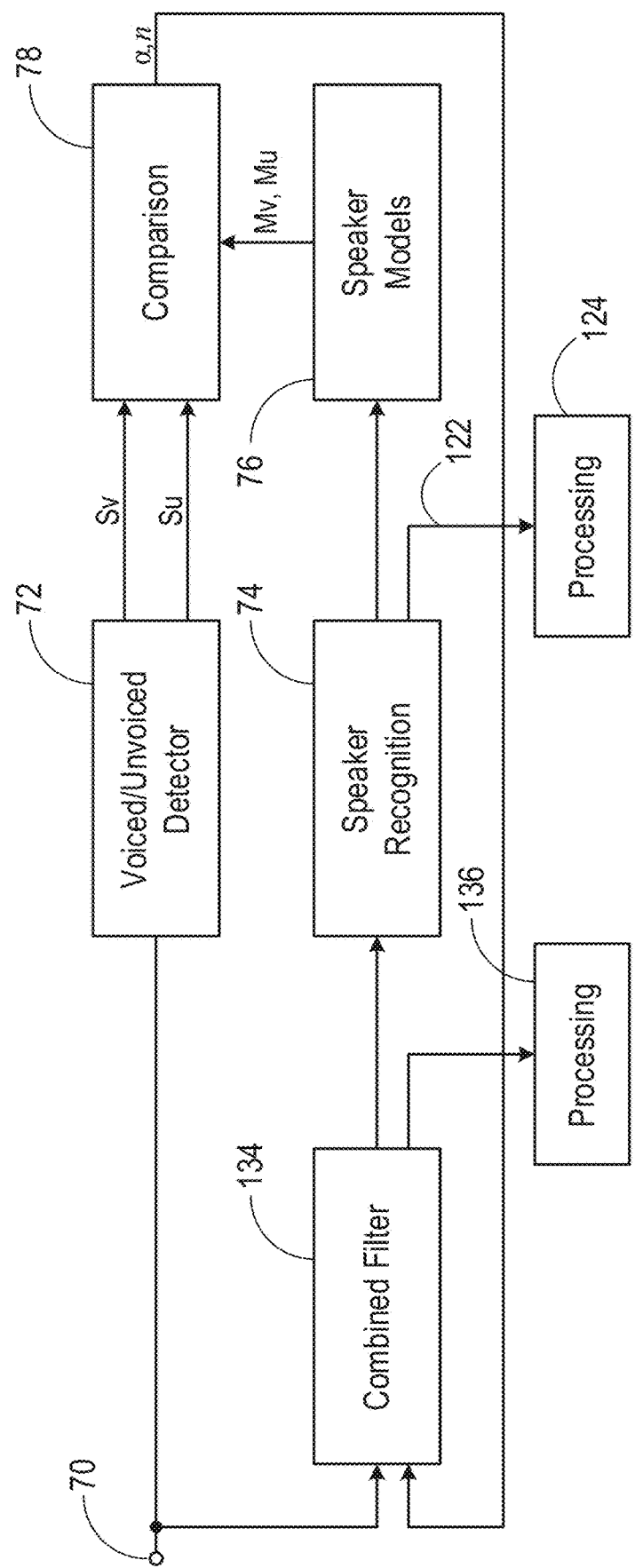
FIG. 8 is a block diagram illustrating a further alternative system for analysing an audio signal.

FIG. 8 illustrates another such use. The system shown in FIG. 8 is similar to the system of FIG. 4, and the same reference numerals are used to refer to the same components of the system.

In the system of FIG. 8, the comparison block 78 is used to obtain information about the channel α and the noise n that are affecting the received audio signal. Specifically, the comparison block 78 may be used to obtain the frequency spectrum of the channel and of the noise. This can be used to take account of the channel and the noise when processing the received audio signal.

For one example, FIG. 8 shows a combined filter block 134, to which the audio signal received on the input 70 is supplied. The combined filter block 134 also receives the frequency spectrum of the channel α and the noise n. The combined filter block 134 acts so as to ensure that channel effects and noise do not adversely affect the operation of the speaker recognition block 74.

For example, the calculated noise characteristic, n, can be subtracted from the received signal, and the remaining signal can be divided by the calculated channel α, before any further processing takes place.

Thus, the output of the speaker recognition block 74, on the output 122, can be improved. That is, it can provide more reliable information about the identity of the speaker. This can then be supplied to any suitable processing block 124, and used for any required purposes.

The output of the combined filter block 134, containing the received signal after the effects of the channel and the noise have been removed, can be supplied to any suitable processing block 136, such as a speech recognition system, or the like.

A further use of the information obtained about the channel and/or the noise affecting the audio signal is to remove their effects from a received audio signal, meaning that the average spectrum of the speech contained in the audio signal can be used as a biometric.

Figure 9:
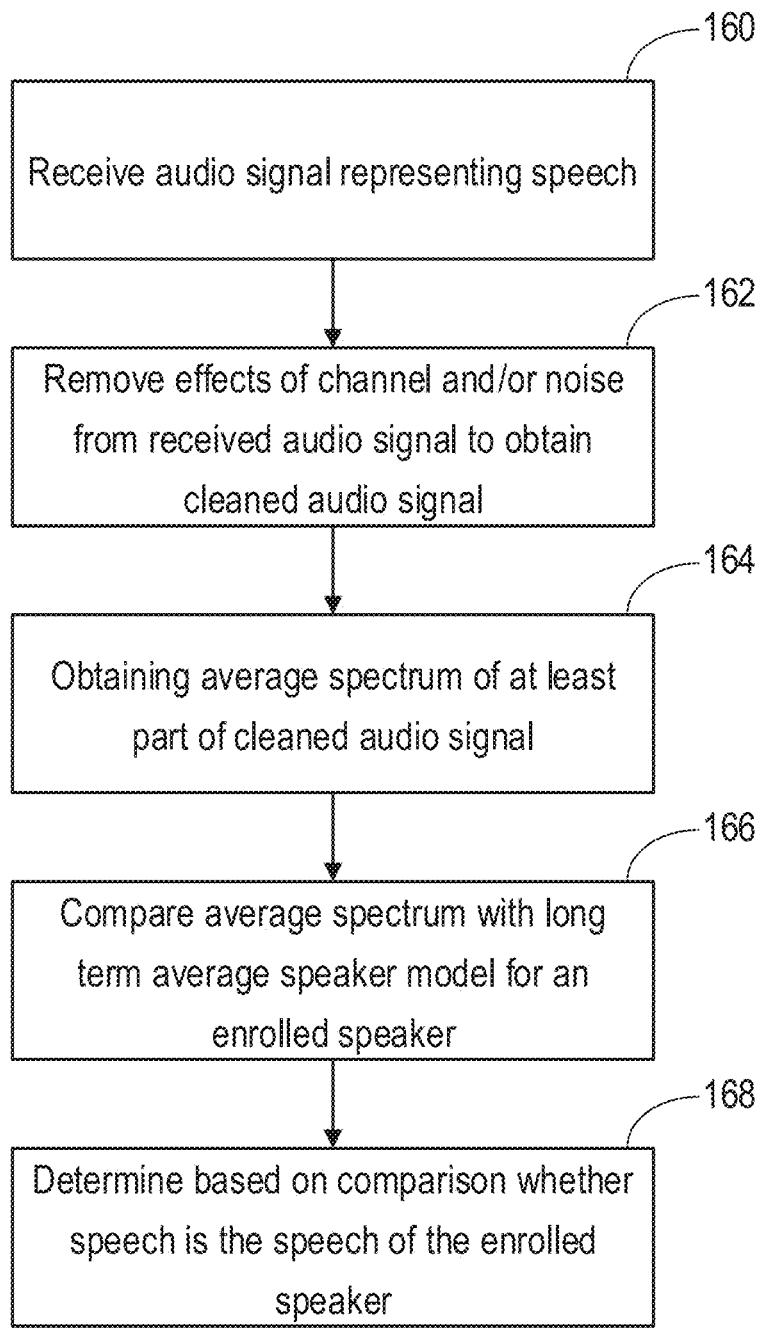
FIG. 9 is a flow chart, illustrating a method of identifying a speaker.
Figure 10:
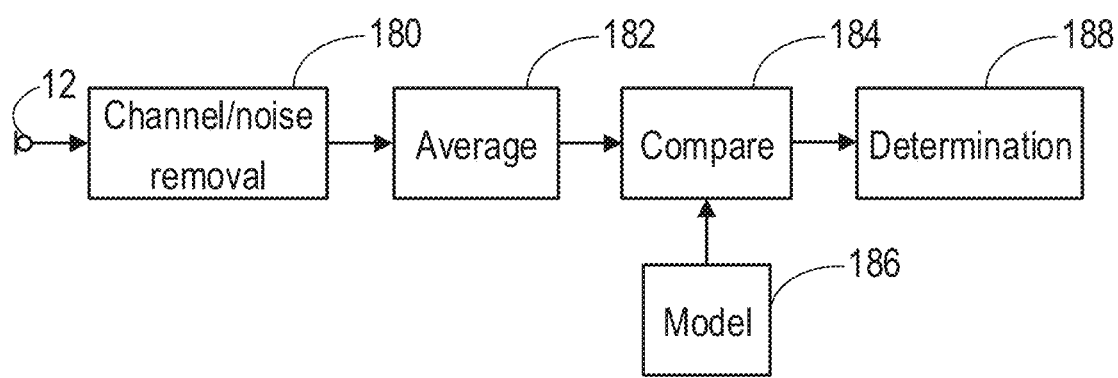
FIG. 10 is a block diagram illustrating a system for identifying a speaker.

FIG. 9 is a flow chart, illustrating a method of speaker identification, and FIG. 10 is a block diagram of a system for performing speaker identification.

As described above, the system may be implemented in a smartphone, such as the smartphone 10, or any other device with voice biometric functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

In step 160 of the method of FIG. 8, the signal generated by a microphone 12 in response to ambient sound is received.

The received signal is divided into frames, which may for example have lengths in the range of 10-100 ms. These frames can be analysed to determine whether they represent speech, and only frames that represent speech are considered further.

The frames that represent speech are passed to a channel/noise removal block 180 and, in step 162 of the method, the effects of a channel and/or noise are removed from the received audio signal to obtain a cleaned audio signal.

The effects of the channel and/or noise can be determined by the method described above, or by any other suitable method, leaving a cleaned audio signal that is not adversely affected by any channel or noise effects.

In step 164 of the method, the cleaned audio signal is passed to an averaging block 182, which obtains an average spectrum of at least a part of the cleaned audio signal.

The average spectrum is a spectrum of the relevant part or parts of the speech obtained and averaged over multiple frames.

The spectrum or spectra can be averaged over enough data to provide reasonable confidence in the information average. In general terms, this average will become more reliable as more data is used to form the average spectrum or spectra. In some cases, spectra averaged over 500 ms of the relevant speech will be enough to provide reliable averaged spectra. The length of time over which the averaged spectrum or spectra are generated may be adapted based on the articulation rate of the speech, in order to ensure that the speech contains enough phonetic variation to provide a reliable average. The length of time over which the averaged spectrum or spectra are generated may be adapted based on the content of the speech.

As mentioned above, an average spectrum of at least a part of the cleaned audio signal is obtained in step 164. For example, this may comprise obtaining an average spectrum for parts of the cleaned audio signal representing one or more audio classes.

To achieve this, one or more components of the cleaned audio signal, representing different acoustic classes of the speech, are extracted from the cleaned audio signal. Extracting the or each component of the cleaned audio signal may comprise identifying periods when the cleaned audio signal contains the relevant acoustic class of speech. More specifically, extracting the component or components of the cleaned audio signal may comprise identifying frames of the cleaned audio signal that contain the relevant acoustic class of speech.

In some embodiments, obtaining an average spectrum of at least a part of the cleaned audio signal comprises obtaining an average spectrum of a part of the cleaned audio signal representing voiced speech.

In some other embodiments, obtaining an average spectrum of at least a part of the cleaned audio signal comprises obtaining a first average spectrum of a part of the cleaned audio signal representing voiced speech and obtaining a second average spectrum of a part of the cleaned audio signal representing unvoiced speech.

When the method involves obtaining an average spectrum for parts of the cleaned audio signal representing one or more audio classes, and the acoustic class is voiced speech (or the first and second acoustic classes of the speech are voiced speech and unvoiced speech), there are several methods that can be used to identify voiced and unvoiced speech, for example: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

As mentioned above, the acoustic classes of the speech may be voiced speech and unvoiced speech. However, the acoustic classes of the speech may be any phonetically distinguishable acoustic classes. For example, they may be different phoneme classes, for example two different sets of vowels; they may be two different fricatives; or a first class may be fricatives while a second class are sibilants.

In step 166 of the method, the obtained average spectrum of at least a part of the cleaned audio signal is passed to a comparison block 184. The comparison block 184 also receives one or more long term average speaker model for one or more enrolled speaker. The term "long term" average speaker model means that enough of the speech of the enrolled speaker was used to form the model, either during enrolment or subsequently, that the model is relatively stable.

In some embodiments or situations, there is only one enrolled speaker, and so the comparison block 184 receives the one or more long term average speaker model for that enrolled speaker. In some other embodiments or situations, there is more than one enrolled speaker, and so the comparison block 184 receives the one or more long term average speaker model for each enrolled speaker.

In some other embodiments or situations, there is more than one enrolled speaker, but there is some additional information regarding the purported speaker. For example, a user of the device may have identified themselves in some way. In that case, the comparison block 184 receives the one or more long term average speaker model for that enrolled speaker.

In addition, in some embodiments, the comparison block 184 may additionally or alternatively receive a Universal Background Model (UBM), for example in the form of a model of the statistically average user.

The one or more long term average speaker model, and the Universal Background Model (UBM) if used, are stored in a model database 186.

The comparison block 184 may receive one or more long term average speaker model corresponding to the part of the cleaned audio signal for which the average spectrum was obtained.

Thus, for example, obtaining an average spectrum of at least a part of the cleaned audio signal may comprise obtaining an average spectrum of a part of the cleaned audio signal representing voiced speech. That is, with a measurement Sv of the spectrum of the voiced speech, and with values having been calculated for the channel, $\alpha$, and for the noise, n, the cleaned measurement SCv of the spectrum of the voiced speech can be calculated as:

$$SCv = \frac{(Sv - n)}{\alpha}.$$

This can then be compared with the long term average speaker model Mv for voiced speech of the or each enrolled speaker being considered by the comparison block 184.

In other examples, obtaining an average spectrum of at least a part of the cleaned audio signal may comprise obtaining a first average spectrum of a part of the cleaned audio signal representing voiced speech and obtaining a second average spectrum of a part of the cleaned audio signal representing unvoiced speech.

As before, the average spectrum of a part of the cleaned audio signal representing voiced speech can be calculated as:

$$SCv = \frac{(Sv - n)}{\alpha},$$

and similarly the average spectrum of a part of the cleaned audio signal representing unvoiced speech can be calculated as:

$$SCu = \frac{(Su - n)}{\alpha}.$$

The first average spectrum SCv is compared with a long term average speaker model Mv for voiced speech of the or each enrolled speaker being considered by the comparison block 184, and the second average spectrum SCu is compared with a long term average speaker model Mu for unvoiced speech of the or each enrolled speaker being considered by the comparison block 184.

In step 168 of the method, the result of the comparison is passed to a determination block 188, which determines based on the comparison whether the speech is the speech of the enrolled speaker being considered by the comparison block 184. As mentioned above, this determination may be an accept/reject decision based on the comparison, as to whether the received speech matches sufficiently closely with the enrolled user who was expected to be the speaker.

In some examples, a small number of speakers (for example from 2 to 10) are enrolled, and suitable models of their speech are obtained during an enrolment process. Then, the determination made by the determination block 188 concerns which of those enrolled speakers was the most likely candidate as the source of the speech in the received audio signal.

This determination may be based on the respective Log Spectral Distances (LSD) of the received speech from the different models, or may use Principal component analysis (PCA) or Linear discriminative analysis (LDA), as examples.

When a Universal Background Model (UBM) is also considered, then the determination may take into account the result of a comparison between the received speech, the model of the enrolled user's speech, and the background model.

Figure 11:
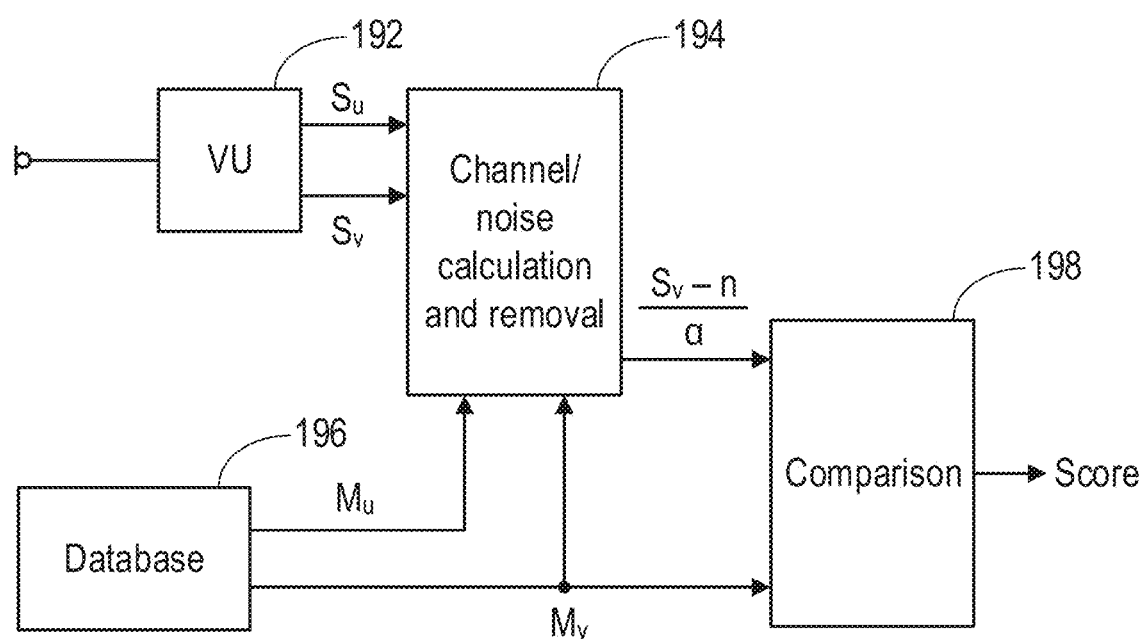
FIG. 11 is a block diagram illustrating a system for identifying a speaker.

FIG. 11 is another block diagram of a system for performing speaker identification.

As described above, the system may be implemented in a smartphone, such as the smartphone 10, or any other device with voice biometric functionality. Thus, the smartphone 10 is able to perform various functions in response to spoken commands from an enrolled user. The biometric functionality is able to distinguish between spoken commands from the enrolled user, and the same commands when spoken by a different person. Thus, certain embodiments of the invention relate to operation of a smartphone or another portable electronic device with some sort of voice operability, for example a tablet or laptop computer, a games console, a home control system, a home entertainment system, an in-vehicle entertainment system, a domestic appliance, or the like, in which the voice biometric functionality is performed in the device that is intended to carry out the spoken command. Certain other embodiments relate to systems in which the voice biometric functionality is performed on a smartphone or other device, which then transmits the commands to a separate device if the voice biometric functionality is able to confirm that the speaker was the enrolled user.

In some embodiments, while voice biometric functionality is performed on the smartphone 10 or other device that is located close to the user, the spoken commands are transmitted using the transceiver 18 to a remote speech recognition system, which determines the meaning of the spoken commands. For example, the speech recognition system may be located on one or more remote server in a cloud computing environment. Signals based on the meaning of the spoken commands are then returned to the smartphone 10 or other local device.

Some embodiments are particularly suited to use in devices, such as home control systems, home entertainment systems, or in-vehicle entertainment systems, in which there will often be multiple enrolled users (for example between two and ten such users), and where the intended operation to be performed in response to a spoken command (such as "play my favourite music", or "increase the temperature in my room", for example) will depend on the identity of the speaker.

As in the system of FIG. 10, the signal generated by a microphone 12 in response to ambient sound is received. The received signal is divided into frames, which may for example have lengths in the range of 10-100 ms. These frames can be analysed to determine whether they represent speech, and only frames that represent speech are considered further.

Components of the received audio signal, representing different acoustic classes of the speech, are then extracted in an extraction block 192. Extracting the or each component of the cleaned audio signal may comprise identifying periods when the audio signal contains the relevant acoustic class of speech. More specifically, extracting the component or components of the audio signal may comprise identifying frames of the audio signal that contain the relevant acoustic class of speech.

In the illustrated embodiment, the extraction block 192 is a voiced/unvoiced detector (VU), which extracts respective components representing voiced and unvoiced speech, and outputs an average spectrum Sv of a part of the audio signal representing voiced speech, and an average spectrum Su of a part of the audio signal representing unvoiced speech.

When the first and second acoustic classes of the speech are voiced speech and unvoiced speech, there are several methods that can be used to identify voiced and unvoiced speech, for example: using a deep neural network (DNN), trained against a golden reference, for example using Praat software; performing an autocorrelation with unit delay on the speech signal (because voiced speech has a higher autocorrelation for non-zero lags); performing a linear predictive coding (LPC) analysis (because the initial reflection coefficient is a good indicator of voiced speech); looking at the zero-crossing rate of the speech signal (because unvoiced speech has a higher zero-crossing rate); looking at the short term energy of the signal (which tends to be higher for voiced speech); tracking the first formant frequency F0 (because unvoiced speech does not contain the first format frequency); examining the error in a linear predictive coding (LPC) analysis (because the LPC prediction error is lower for voiced speech); using automatic speech recognition to identify the words being spoken and hence the division of the speech into voiced and unvoiced speech; or fusing any or all of the above.

As mentioned above, the acoustic classes of the speech may be voiced speech and unvoiced speech. However, the acoustic classes of the speech may be any phonetically distinguishable acoustic classes. For example, they may be different phoneme classes, for example two different sets of vowels; they may be two different fricatives; or a first class may be fricatives while a second class are sibilants.

The average spectra of the two components of the signal representing the two acoustic classes of the speech are then passed to a channel/noise calculation and removal block 194.

In some embodiments, the system is provided with a purported identity of the speaker, and it is required to determine whether the received signal has in fact come from that speaker (referred to as speaker verification). In other embodiments, the system has multiple enrolled speakers, but has no further information as to which of the enrolled speakers is speaking at any given time, and it is required to identify which of those enrolled speakers is the speaker (referred to as speaker identification).

The system includes a database 196, which stores a long term average speaker model Mv for voiced speech of the or each enrolled speaker and a long term average speaker model Mu for unvoiced speech of the or each enrolled speaker (or models of other acoustic classes of the speech of each enrolled speaker).

As described above, the system may be required to perform speaker verification, or speaker identification.

In the case of speaker verification, the average spectrum Sv of the part of the audio signal representing voiced speech, and the average spectrum Su of the part of the audio signal representing unvoiced speech, are combined with the model Mv for voiced speech of the purported speaker and the long term average speaker model Mu for unvoiced speech of the purported speaker to obtain values for the channel, α, and for the noise, n. Specifically, as before:

$$\alpha = \frac{(Su - Sv)}{(Mu - Mv)}, \text{ and}$$

-continued $$n = \frac{(SuMv - SvMu)}{(Mu - Mv)}.$$

The channel/noise calculation and removal block 194 then removes the effect of the calculated channel and noise, to obtain a cleaned measurement SCv of the average spectrum of the voiced speech, calculated as:

$$SCv = \frac{(Sv - n)}{\alpha}.$$

In other embodiments, a cleaned measurement SCu of the average spectrum of the unvoiced speech can be similarly calculated as:

$$SCu = \frac{(Sv - n)}{\alpha}.$$

The cleaned measurement of the average spectrum of the relevant part of the speech is then passed to a comparison block 198, for comparison with the respective model of that part of the speech of the purported user. The comparison score is output, indicating whether the cleaned measurement (s) of the average spectrum of the relevant part(s) of the speech is/are close enough to the model(s) to have a required degree of confidence that the signal comes from the speech of the purported speaker. As before, the comparison block 198 may additionally receive a Universal Background Model (UBM), for example in the form of a model of the statistically average user, from the database 196, and may use this when providing the output comparison score.

In the case of speaker identification, the average spectrum Sv of the part of the audio signal representing voiced speech, and the average spectrum Su of the part of the audio signal representing unvoiced speech, are combined with the respective models Mv for voiced speech of each enrolled speaker and the long term average speaker model Mu for unvoiced speech of each enrolled speaker to obtain preliminary or hypothetical values for the channel, α, and for the noise, n. Specifically, as before:

$$\alpha = \frac{(Su - Sv)}{(Mu - Mv)}, \text{ and}$$

$$n = \frac{(SuMv - SvMu)}{(Mu - Mv)}.$$

These values for channel and noise are calculated for each of the possible speakers.

The results may be such that it is clear that the speech could not have come from one or more of the enrolled speakers. Specifically, if the calculated values for the channel α, based on the models for a particular speaker, are clearly physically implausible, it can be assumed that that speaker was not the source of the received speech signal. For example, if there are very large variations (of more than 20 dB, say) in one of the calculated channels across the relevant frequency range, or if there are significant discontinuities in one of the calculated channels, this might indicate that that channel is physically implausible, and hence that the speaker whose model led to that calculated channel was not the person speaking at that time.

Otherwise, the channel/noise calculation and removal block 194 removes the effect of each of the calculated channel and noise values from the received signal, to obtain respective cleaned hypothetical measurements SCv of the average spectrum of the voiced speech, on the assumption that the speaker was the person whose speech model was used as the basis for those calculated values of the channel and noise.

Thus, in a case with two enrolled speakers A and B, having respective models MvA and MvB for their voiced speech and having respective models MuA and MuB for their unvoiced speech, it is possible to obtain respective hypothetical values for the channel and noise, namely:

$$\alpha A = \frac{(Su - Sv)}{(MuA - MvA)}, \text{ and}$$

$$nA = \frac{(SuMvA - SvMuA)}{(MuA - MvA)} \text{ for enrolled speaker } A, \text{ and}$$

$$\alpha B = (Su - Sv)/(MuB - MvB), \text{ and}$$

$$nB = \frac{(SuMvB - SvMuB)}{(MuB - MvB)} \text{ for enrolled speaker } B.$$

These are then provisionally removed from the received signal to give respective hypothetical cleaned measurements for the two enrolled users, namely:

$$SCvA = \frac{(Sv - nA)}{\alpha A} \text{ for enrolled speaker } A, \text{ and}$$

$$SCvB = \frac{(Sv - nB)}{\alpha B} \text{ for enrolled speaker } B.$$

These hypothetical cleaned measurements of the average spectrum of the relevant part of the speech are then passed to a comparison block 198, for comparison with the respective model of that part of the speech of the relevant user.

Thus, SCvA is compared with the model MvA, for enrolled speaker A, and SCvB is compared with the model MvB for enrolled speaker B.

The comparison score is then output, indicating whether the hypothetical cleaned measurement of the average spectrum of the relevant part of the speech for one of the enrolled speakers is close enough to the respective model to have a required degree of confidence that the signal comes from the speech of that enrolled speaker.

The result output by the comparison block 198 may simply indicate which of those enrolled speakers was the most likely candidate as the source of the speech in the received audio signal.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. A method of speaker identification, comprising:
receiving an audio signal representing speech comprising voiced speech and unvoiced speech;
removing effects of a channel and/or noise from the received audio signal to obtain a cleaned audio signal;
obtaining an average spectrum of at least a part of the cleaned audio signal representing voiced speech;
comparing the average spectrum with a long term average speaker model for an enrolled speaker; and
determining based on the comparison whether the speech is the speech of the enrolled speaker;
wherein obtaining an average spectrum of at least a part of the cleaned audio signal comprises obtaining a first average spectrum of a part of the cleaned audio signal representing a first acoustic class and obtaining a second average spectrum of a part of the cleaned audio signal representing a second acoustic class different from the first acoustic class, and
wherein comparing the average spectrum with a long term average speaker model for an enrolled speaker comprises comparing the first average spectrum with a long term average speaker model for the first acoustic class for the enrolled speaker and comparing the second average spectrum with a long term average speaker model for the second acoustic class for the enrolled speaker.

2. A method according to claim 1, wherein the first acoustic class is voiced speech and the second acoustic class is unvoiced speech.

3. A method according to claim 1, comprising comparing the average spectrum with respective long term average speaker models for each of a plurality of enrolled speakers; and
determining based on the comparison whether the speech is the speech of one of the enrolled speakers.

4. A method according to claim 3, further comprising comparing the average spectrum with a Universal Background Model; and
including a result of the comparing the average spectrum with the Universal Background Model in determining whether the speech is the speech of one of the enrolled speakers.

5. A method according to claim 3, comprising identifying one of the enrolled speakers as a most likely candidate as a source of the speech.

6. A method according to claim 1, comprising:
obtaining information about the effects of a channel and/or noise on the received audio signal by:
receiving the audio signal representing speech;
extracting first and second components of the audio signal representing first and second acoustic classes of the speech respectively;
analysing the first and second components of the audio signal with models of the first and second acoustic classes of the speech of an enrolled user; and
based on said analysing, obtaining information about at least one of a channel and noise affecting said audio signal.

7. A method according to claim 6, comprising analysing the first and second components of the audio signal with models of the first and second acoustic classes of the speech of a plurality of enrolled users, to obtain respective hypothetical values of the channel, and determining that the speech is not the speech of any enrolled speaker whose models give rise to physically implausible hypothetical values of the channel.

8. A method according to claim 7, wherein a hypothetical value of the channel is considered to be physically implausible if it contains variations exceeding a threshold level across the relevant frequency range.

9. A method according to claim 7, wherein a hypothetical value of the channel is considered to be physically implausible if it contains significant discontinuities.

10. A system for analysis of an audio signal, the system comprising:
an input for receiving an audio signal, and one or more processors configured to:
receive an audio signal representing speech;
remove effects of a channel and/or noise from the received audio signal to obtain a cleaned audio signal;
obtain an average spectrum of at least a part of the cleaned audio signal representing voiced speech representing voiced speech;
compare the average spectrum with a long term average speaker model for an enrolled speaker; and
determine based on the comparison whether the speech is the speech of the enrolled speaker;
wherein obtaining an average spectrum of at least a part of the cleaned audio signal comprises obtaining a first average spectrum of a part of the cleaned audio signal representing a first acoustic class and obtaining a second average spectrum of a part of the cleaned audio signal representing a second acoustic class , and
wherein comparing the average spectrum with a long term average speaker model for an enrolled speaker comprises comparing the first average spectrum with a long term average speaker model for the first acoustic class for the enrolled speaker and comparing the second average spectrum with a long term average speaker model for the second acoustic class for the enrolled speaker.

11. A non-transitory computer readable storage medium having computer-executable instructions stored thereon that, when executed by processor circuitry, cause the processor circuitry to perform a method according to claim 1.

* * * * *

UNITED STATES PATENT AND TRADEMARK OFFICE
CERTIFICATE OF CORRECTION

Page 1 of 1

PATENT NO. : 11,074,917 B2
APPLICATION NO. : 16/170717
DATED : July 27, 2021
INVENTOR(S) : John Paul Lesso It is certified that error appears in the above-identified patent and that said Letters Patent is hereby corrected as shown below:

In the Claims

1. In Column 18, Line 59, in Claim 10, delete "an average spectrum" and insert -- the average spectrum --, therefor.

2. In Column 18, Line 66, in Claim 10, delete "an enrolled speaker" and insert -- the enrolled speaker --, therefor.

Signed and Sealed this
Fifteenth Day of August, 2023

Katherine Kelly Vidal
*Director of the United States Patent and Trademark Office*